(12) United States Patent
Yu et al.

(10) Patent No.: US 10,825,425 B2
(45) Date of Patent: Nov. 3, 2020

(54) INFORMATION DISPLAY METHOD AND INFORMATION DISPLAY APPARATUS SUITABLE FOR MULTI-PERSON VIEWING

(71) Applicants: Industrial Technology Research Institute, Hsinchu (TW); Intellectual Property Innovation Corporation, Hsinchu (TW)

(72) Inventors: Tzu-Yi Yu, Kaohsiung (TW); Kuo-Ping Chang, Taoyuan (TW); Heng-Yin Chen, Hsinchu County (TW); Jia-Chong Ho, Hsinchu (TW)

(73) Assignees: Industrial Technology Research Institute, Hsinchu (TW); Intellectual Property Innovation Corporation, Hsinchu (TW)

( * ) Notice: Subject to any disclaimer, the term of this patent is extended or adjusted under 35 U.S.C. 154(b) by 3 days.

(21) Appl. No.: 16/244,104

(22) Filed: Jan. 10, 2019

(65) Prior Publication Data
US 2020/0074961 A1 Mar. 5, 2020

(30) Foreign Application Priority Data
Aug. 28, 2018 (TW) .............................. 107129913 A

(51) Int. Cl.
*G09G 5/377* (2006.01)
*G09G 5/14* (2006.01)
(Continued)

(52) U.S. Cl.
CPC .............. *G09G 5/377* (2013.01); *G09G 5/14* (2013.01); *G09G 2354/00* (2013.01); *H04N 13/111* (2018.05); *H04N 19/597* (2014.11)

(58) Field of Classification Search
None
See application file for complete search history.

(56) References Cited

U.S. PATENT DOCUMENTS 9,442,644 B1 * 9/2016 Bostick ............... G06F 3/04842
9,639,154 B2    5/2017 Bostick et al.
(Continued)

FOREIGN PATENT DOCUMENTS

CN    102402287    4/2012
CN    102868897    1/2013
(Continued)

OTHER PUBLICATIONS

"Notice of allowance of Taiwan Counterpart Application," dated Jun. 27, 2019, p. 1-p. 5.

*Primary Examiner* — Steven Z Elbinger
(74) *Attorney, Agent, or Firm* — JCIPRNET

(57) ABSTRACT

An information display method and an information display apparatus suitable for multi-person viewing are provided. The method is adapted to an electronic apparatus having a transparent display and a processor, and the method includes following steps: detecting a plurality of users viewing the transparent display, and calculating a gaze range of each user viewing the transparent display; calculating an intersection range of the gaze ranges of the users and determining whether a ratio of the intersection range to the gaze ranges exceeds a preset intersection ratio; displaying object information of the objects appeared in the gaze range according to each of the gaze ranges if the ratio does not exceed the preset intersection ratio; and displaying object information of the objects appeared in the gaze range according to the intersection range if the ratio exceeds the preset intersection ratio.

20 Claims, 11 Drawing Sheets

(51) Int. Cl.
  *H04N 19/597* (2014.01)
  *H04N 13/111* (2018.01)

(56) References Cited

U.S. PATENT DOCUMENTS

| | | |
|---|---|---|
| 9,836,889 B2 | 12/2017 | Sugden et al. |
| 10,360,876 B1* | 7/2019 | Rahman ................ G06F 1/1605 |
| 2010/0269037 A1* | 10/2010 | Atkins .................... G09G 5/14 |
| | | 715/244 |
| 2012/0072873 A1 | 3/2012 | Park et al. |
| 2013/0316767 A1 | 11/2013 | Cai et al. |
| 2014/0192090 A1* | 7/2014 | Park ................... G06F 3/04886 |
| | | 345/672 |
| 2016/0041727 A1* | 2/2016 | Choi ....................... G06T 11/60 |
| | | 715/835 |
| 2016/0263477 A1* | 9/2016 | Ladd ....................... A63F 13/26 |
| 2016/0299666 A1* | 10/2016 | Sakamoto ............. G06F 3/0488 |
| 2016/0314624 A1 | 10/2016 | Li et al. |
| 2017/0309215 A1* | 10/2017 | Perdices-Gonzalez ..................... |
| | | G09G 3/3208 |
| 2019/0057531 A1* | 2/2019 | Sareen ................ A63F 13/5255 |

FOREIGN PATENT DOCUMENTS

| | | |
|---|---|---|
| CN | 103581618 | 2/2014 |
| CN | 104272371 | 1/2015 |
| TW | 201017473 | 5/2010 |
| TW | 201347702 | 12/2013 |
| TW | I549505 | 9/2016 |
| TW | I629675 | 7/2018 |

* cited by examiner

INFORMATION DISPLAY METHOD AND INFORMATION DISPLAY APPARATUS SUITABLE FOR MULTI-PERSON VIEWING

CROSS-REFERENCE TO RELATED APPLICATION

This application claims the priority benefit of a Taiwan application serial no. 107129913, filed on Aug. 28, 2018. The entirety of the above-mentioned patent application is hereby incorporated by reference herein.

BACKGROUND OF THE DISCLOSURE

Field of the Disclosure

The disclosure relates to an information display method and an information display apparatus, and particularly relates to an information display method and an information display apparatus suitable for multi-person viewing.

Description of Related Art

Transparent displays may be classified into transmission transparent displays and projection transparent displays according to technical principles. The transmission transparent display makes a display panel transparent, and the projection transparent display projects images onto a reflective and transparent substrate to achieve a transparent display effect.

The transparent display has characteristics of transparency, lightness and slimness, etc., which is adapted to combine virtual images displayed on the display with real-world scenes to give a viewer a visualized and intuitive interactive experience. The viewer may not only view a real object through the transparent display, but may also view information superimposed to the real object or displayed around the real object through the transparent display, and even interact with the display information on the transparent display through a touch technology.

The transparent displays have been widely used in applications such as automotive head-up displays, vending machines, commodity windows, museum exhibits, sightseeing vehicles, etc. At present, most of the transparent displays display information independently, and the display information is difficult to interact with the real object or the user. If multiple users use the same transparent display, it is difficult for all of the multiple users to view the correct display information.

For example, FIG. 1 is a schematic diagram of displaying information by a transparent display. Referring to FIG. 1, when a user 12 and a user 14 simultaneously view an object 16 located at another side relative to the user through a transparent display 10, by identifying relative positions between the users 12, 14 and the object 16, a position where the user 12 and the user 14's sight lines fall on the transparent display 10 is determined, so as to display object information (i.e. Kallima inachus) of the object 16 at such position. However, the repeatedly displayed object information may easily confuse the users, and when user's sight lines are intersected, the users probably view wrong object information.

SUMMARY OF THE DISCLOSURE

An embodiment of the disclosure provides an information display method suitable for multi-person viewing. The method is adapted to an electronic apparatus having a transparent display and a processor, and the method includes following steps: detecting a plurality of users viewing the transparent display, and calculating a gaze range of each of the users viewing the transparent display; calculating an intersection range of the gaze ranges of the users and determining whether a ratio of the intersection range to the gaze ranges exceeds a preset intersection ratio; displaying object information of objects appeared in the gaze range according to each of the gaze ranges if the ratio of the intersection range to the gaze ranges does not exceed the preset intersection ratio; and displaying object information of the objects appeared in the gaze range according to the intersection range if the ratio of the intersection range to the gaze ranges exceeds the preset intersection ratio.

An embodiment of the disclosure provides an information display apparatus including a transparent display, a first information capturing device, a second information capturing device and a processor. The first information capturing device is configured to capture internal user information of users viewing the transparent display. The second information capturing device is configured to capture external object information at another side of the transparent display relative to the users. The processor is coupled to the transparent display, the second information capturing device and the first information capturing device, and is configured to load and execute a plurality of program instructions to: detect the users in the internal user information, and calculate a gaze range of each of the users viewing the transparent display; calculate an intersection range of the gaze ranges of the users and determine whether the ratio of the intersection range to the gaze ranges exceeds a preset intersection ratio; display object information of objects appeared in the gaze range according to each of the gaze ranges if the ratio of the intersection range to the gaze ranges does not exceed the preset intersection ratio; and display object information of the objects appeared in the gaze range according to the intersection range if the ratio of the intersection range to the gaze ranges exceeds the preset intersection ratio.

In order to make the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

In an embodiment of the disclosure, in case that multiple people view a transparent display, gaze ranges of user's eyes are used to confirm an object viewed by the users, and a display method and display position of object information are determined according to an intersection the gaze ranges of the multiple users, such that the multiple users may view correct object information while reducing the amount of information displayed. Moreover, an embodiment of the disclosure further uses techniques of object category identification, object shape identification, display information shape identification, user visual range identification, etc., such that the display information is adapted to be viewed by a plurality of the users.

Figure 1:
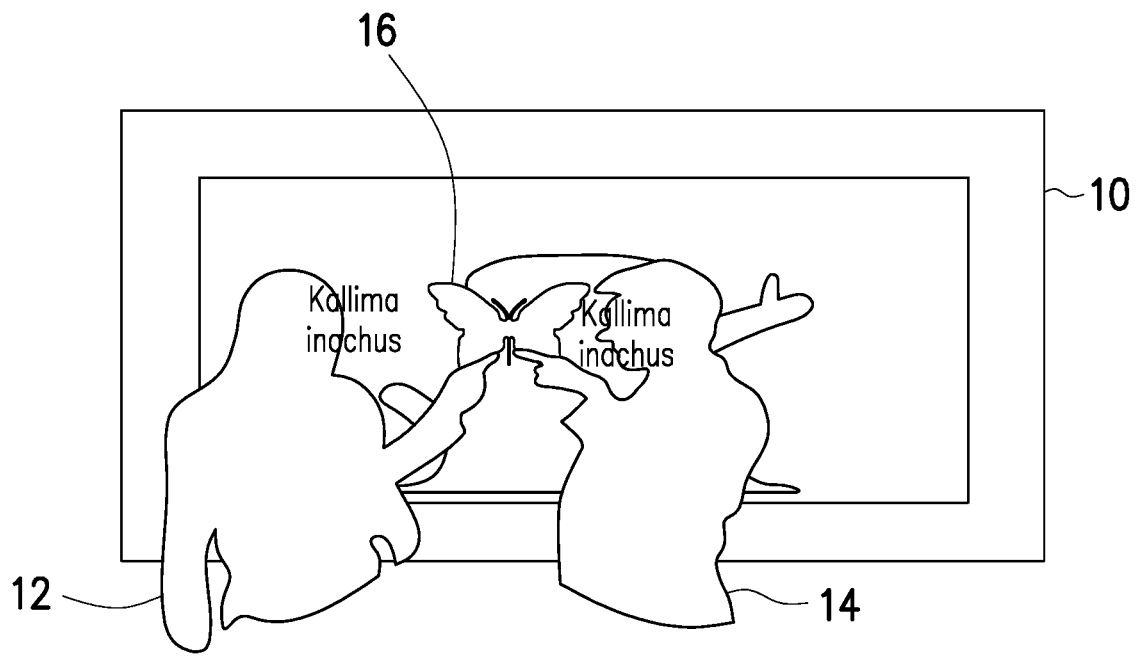
FIG. 1 is a schematic diagram of displaying information by a transparent display.
Figure 2:
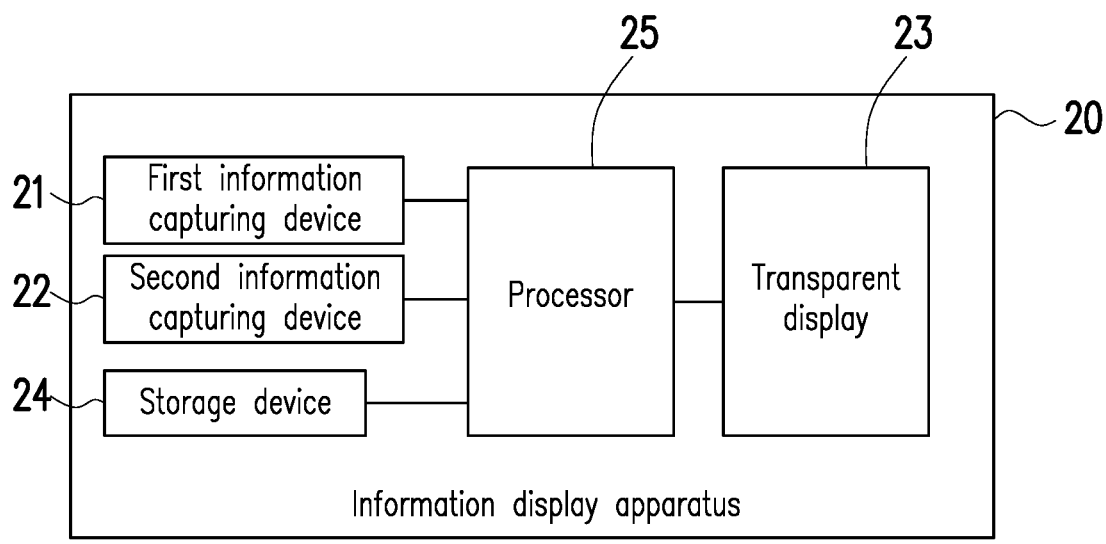
FIG. 2 is a block diagram of an information display apparatus suitable for multi-person viewing according to an embodiment of the disclosure.

FIG. 2 is a block diagram of an information display apparatus suitable for multi-person viewing according to an embodiment of the disclosure. Referring to FIG. 2, the information display apparatus 20 of the embodiment is, for example, an electronic device having a transparent display function, which includes a first information capturing device 21, a second information capturing device 22, a transparent display 23, a storage device 24 and a processor 25, where the first information capturing device 21 (for example, an internal sensing or a pointing device) is used for capturing internal user information, which includes capturing of user's pointing direction, and the pointing direction may be a pointing behavior such as a user's sight line direction, a remote controller pointing direction, a projected direction of the user's touch, eyeball, etc., detected by an image sensor, an eye tracing device or an infrared sensor, and is not limited to a pointing behavior of a user image captured by a camera. The second information capturing device 22 (for example, an external object positioning device) is used for external object identification and positioning, and may also be used for network communication device positioning of the object, for example, Bluetooth transmitter and receiver to identify objects and positions, and is not limited to a pointing behavior of a user image captured by a camera.

In an embodiment, the first information capturing device 21 and the second information capturing device 22 respectively include a lens and an image sensor, where the lens may be composed of a plurality of concave-convex lenses, and an actuator such as a stepper motor or a voice coil motor may be adapted to change a relative position between the lenses, so that a focal length of the lens is changed, and the captured object may be imaged on the image sensor. The image sensor is configured with a Charge Coupled Device (CCD), a Complementary Metal-Oxide Semiconductor (CMOS) or other types of photosensing device, and is adapted to sense the light intensity entering the lens, so as to capture the image signal to generate and output an image. In the embodiment, the first information capturing device 21 is used for capturing an internal image including the users viewing the transparent display 23, and the second information capturing device 22 is used for capturing an external image at another side of the transparent display 23 relative to the users. In another embodiment, the first information capturing device 21 and the second information capturing device 22 may also include a programmable processing unit, a micro-processor, an Application Specific Integrated Circuits (ASIC), a Programmable Logic Device (PLD) or other similar circuit device adapted to implement an object identification function, which is not limited by the disclosure.

The transparent display 23 refers to a display having a certain degree of light transmittance, and when the user views the transparent display, a background at another side of the display relative to the users may be presented, for example, a transmission transparent display such as a Thin Film Transistor Liquid Crystal Display (TFT-LCD), a field sequential color display, an Active Matrix Organic Light Emitting Display (AMOLED), an electrowetting display, etc., or a projection transparent display. In addition to the transparent display 23 having a transparent display panel adapted to see through and display information, the transparent display 23 may also be integrated with a touch panel adapted to detect touch operations of the users, so as to implement interactions between the users and the display information.

The storage device 24 may be any type of a fixed or a removable Random Access Memory (RAM), a Read-Only Memory (ROM), a flash memory, or a similar device or a combination of the above devices. In the embodiment, the storage device 24 is used for storing image data captured by the first information capturing device 21 and the second information capturing device 22, and recording computer programs or instructions accessible and executable by the processor 25.

The processor 25 is, for example, a Central Processing Unit (CPU), or other programmable general use or special use microprocessor, a Digital Signal Processor (DSP), a programmable controller, an Application Specific Integrated Circuits (ASIC), a Programmable Logic Device (PLD), or another similar device, or a combination of the above devices. The processor 25 is coupled to the first information capturing device 21, the second information capturing device 22, the transparent display 23 and the storage device 24, and is, for example, adapted to load program instructions from the storage device 24 to execute an information display method suitable for multi-person viewing of an embodiment of the disclosure. In other embodiments, the information display apparatus 20 may further include a communication module used for communicating with an external device, an eye tracing device used for tracing eyeballs of the users viewing the transparent display 23, etc., and the types of the devices are not limited by the embodiment. An embodiment is provided below to describe detailed steps of the information display method suitable for multi-person viewing.

Figure 3:
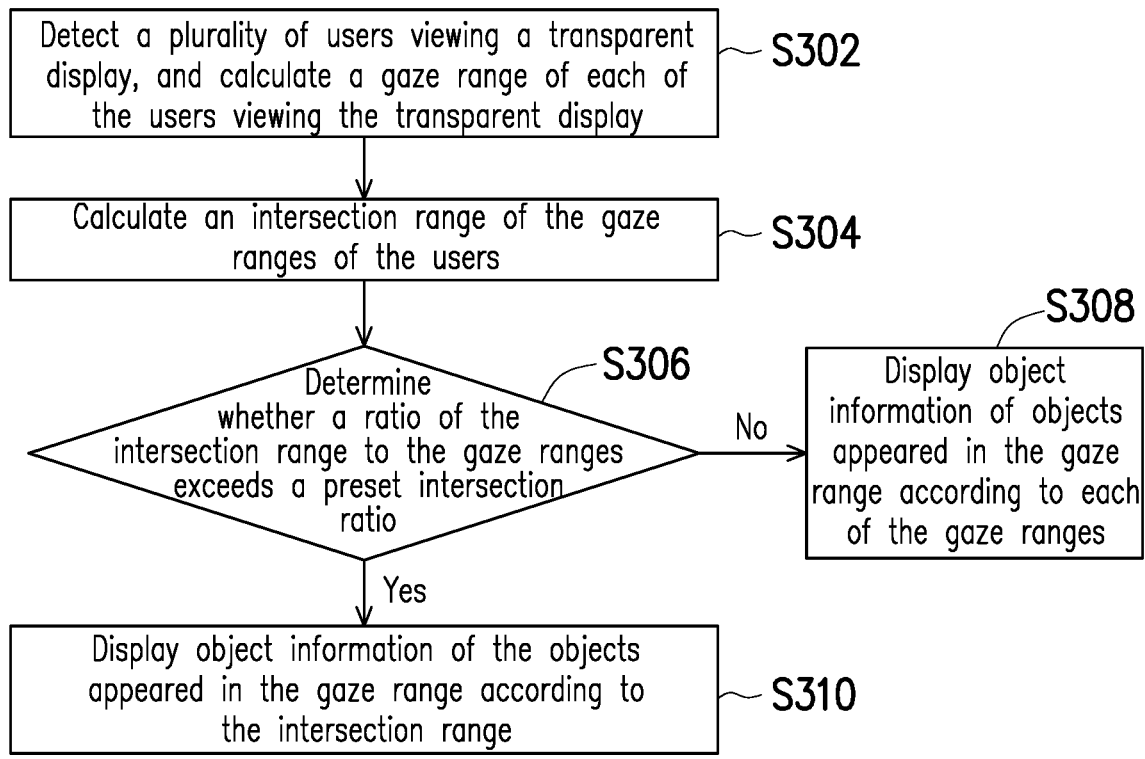
FIG. 3 is a flowchart illustrating an information display method suitable for multi-person viewing according to an embodiment of the disclosure.

FIG. 3 is a flowchart illustrating an information display method suitable for multi-person viewing according to an embodiment of the disclosure. Referring to FIG. 2 and FIG. 3, the method of the embodiment is adapted to the information display apparatus 20 of FIG. 2, and steps thereof are as follow:

First, the processor 25 detects a plurality of users viewing the transparent display 23, and calculates a gaze range of each of the users viewing the transparent display 23 (step S302). The processor 25, for example, estimates a distance between the user and the transparent display 23 according to an area occupied by the user in the internal image captured by the first information capturing device 21, and estimates a sight line direction of the user according to positions, sizes or a proportional relationship of the user's face, eyes, etc., in the internal image. Then, the processor 25 calculates a range that the eyes can clearly identify the objects on the transparent display 23 (i.e. the gaze range) by using the above distance between the eyes and the transparent display 23 according to a central identification angle of a human eye.

In detail, a horizontal angle of human eye's visual range is about 124°, a vertical angle thereof is about 120°, and a comprehensive viewing angle of the two eyes is about 170°. Photoreceptor cells of the human eye are not evenly distributed and are denser at the center of the concave than other portions. A central identification angle of a human eye would be an angle, for example, 0°-30°, when facing the front side, where the human eyes may clearly see objects' presence and identify the objects within such range, and an angle of 30° and beyond is used for the light detection. Therefore, assuming that a distance between the human eye and the transparent display 23 is M, a central identification angle of a human eye is 15°, a gaze range A thereof may be obtained according to a following equation:

$$d = M \times \tan 15°$$

$$A = \pi \times d^2$$

After obtaining the gaze range of each of the users on the transparent display 23, the processor 25 calculates an intersection range of the gaze ranges (step S304), and determines whether a ratio of the intersection range to the gaze ranges exceeds a preset intersection ratio (step S306). In an embodiment, the processor 25 divides the intersection range by a union range of the gaze ranges to obtain the ratio of the intersection range to the gaze ranges, where the preset intersection ratio is, for example, a ratio of 70% or other ratios greater than 60%.

If the ratio of the intersection range to the gaze ranges does not exceed the preset intersection ratio, it is deduced that multiple people are respectively viewing different objects, and now the processor 25 displays object information of the objects appeared in the gaze range according to each of the gaze ranges (step S308). In an embodiment, the processor 25 may identify the objects appeared in the gaze ranges to obtain the object information, and display the object information individually in or around the corresponding gaze range.

If the ratio of the intersection range to the gaze ranges exceeds the preset intersection ratio, it is deduced that multiple people are viewing the same one or a plurality of objects, and now the processor 25 displays object information of the objects appeared in the gaze range according to the intersection range (step S310). In an embodiment, the processor 25 may identify the objects appeared in the gaze ranges to obtain the object information, and integrate the object information for displaying in or around the intersection range.

Based on the above, the method may determine whether multiple people are viewing the same object to properly integrate the object information and display the object information in or around the intersection range adapted to be viewed by multiple people, and accordingly avoiding information disorder that may cause the user to misread and confuse the user.

In an embodiment, when the information display apparatus 20 determines that the ratio of the intersection range to the gaze ranges exceeds the preset intersection ratio, the information display apparatus 20 may further identify the type of the object to determine whether to display the object information in combination.

Figure 4:
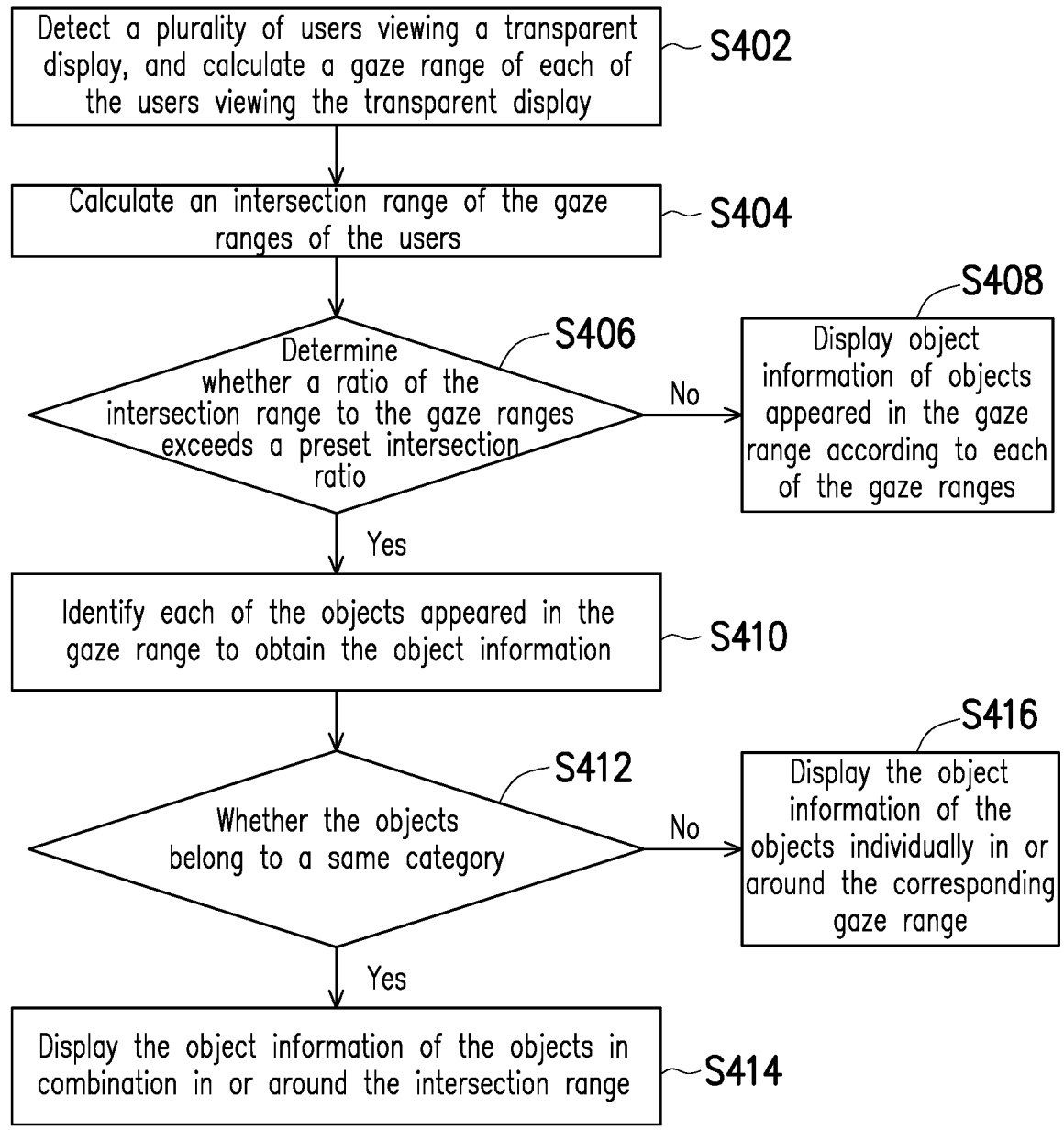
FIG. 4 is a flowchart illustrating an information display method suitable for multi-person viewing according to an embodiment of the disclosure.

FIG. 4 is a flowchart illustrating an information display method suitable for multi-person viewing according to an embodiment of the disclosure. Referring to FIG. 2 and FIG. 4, the method of the embodiment is adapted to the information display apparatus 20 of FIG. 2, and steps of the method are as follows:

First, the processor 25 detects a plurality of users viewing the transparent display 23, and calculates a gaze range of each of the users viewing the transparent display 23 (step S402), and then calculates an intersection range of the gaze ranges (step S404), and determines whether a ratio of the intersection range to the gaze ranges exceeds a preset intersection ratio (step S406). If the ratio of the intersection range to the gaze ranges does not exceed the preset intersection ratio, the processor 25 displays object information of objects appeared in the gaze range according to each of the gaze ranges (step S408). The above steps S402-S408 are the same or similar to the steps S302-S308 of the aforementioned embodiment, and details thereof are not repeated.

In the embodiment, if the ratio of the intersection range to the gaze ranges exceeds the preset intersection ratio, the processor 25 identifies each of the objects appeared in the gaze range to obtain the object information (step S410), and determines whether the objects belong to a same category according to the object information (step S412).

If the objects belong to the same category, the processor 25 displays the object information of the objects in combination in or around the intersection range (step S414). In an embodiment, the processor 25, for example, identifies shapes (for example, contours or regions) of the objects to generate physical ranges that may respectively cover the shapes of the objects, such that when the object information is displayed, the object information of the objects is kept away from junction ranges of the physical ranges, and is displayed in or around the intersection range of the gaze ranges. The physical ranges are, for example, minimum rectangles adapted to cover the shapes of the objects, though the disclosure is not limited thereto.

Conversely, if the objects do not belong to the same category, the processor individually displays the object information of the objects in or around the corresponding gaze range (step S416). In an embodiment, the processor 25 may also identifies shapes of the objects to generate physical ranges that may respectively cover the objects, such that when the object information is displayed, the object information of the objects is kept away from junction ranges of the physical ranges and kept away from the intersection range of the gazing ranges, and is displayed in or around the corresponding gaze range.

In an embodiment, when the information display apparatus 20 displays the object information, the information display apparatus 20 may determine positions and method of displaying the object information according to the shapes of the objects viewed by the users, such that the displayed object information is adapted to be viewed by the users.

Figure 5A:
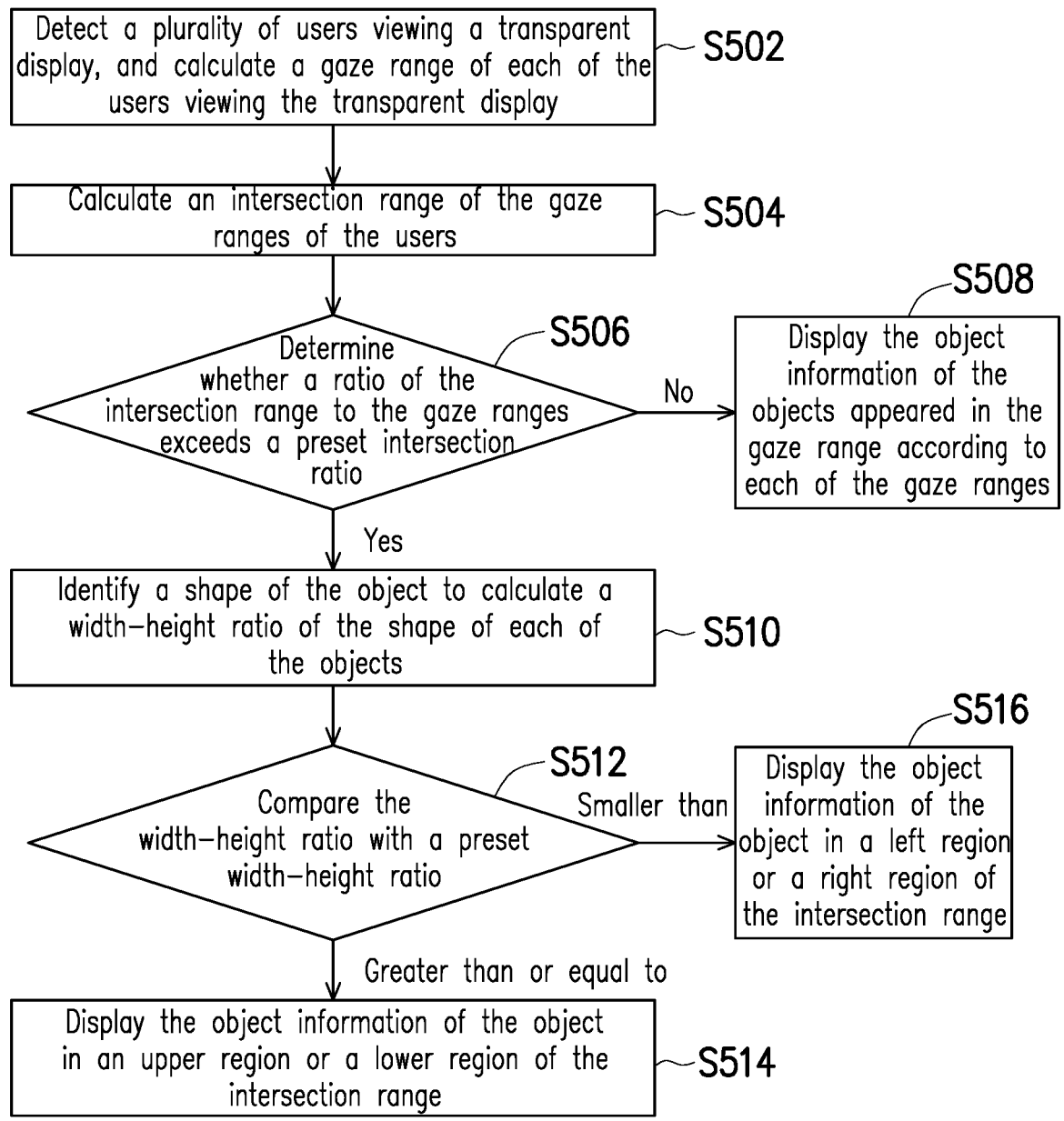
FIG. 5A is a flowchart illustrating an information display method suitable for multi-person viewing according to an embodiment of the disclosure.

FIG. 5A is a flowchart illustrating an information display method suitable for multi-person viewing according to an embodiment of the disclosure. Referring to FIG. 2 and FIG. 5A, the method of the embodiment is adapted to the information display apparatus 20 of FIG. 2, and steps of the method are as follows:

First, the processor 25 detects a plurality of users viewing the transparent display 23, and calculates a gaze range of each of the users viewing the transparent display 23 (step S502), and then calculates an intersection range of the gaze ranges (step S504), and determines whether a ratio of the intersection range to the gaze ranges exceeds a preset intersection ratio (step S506). If the ratio of the intersection range to the gaze ranges does not exceed the preset intersection ratio, the processor 25 displays object information of objects appeared in the gaze range according to each of the gaze ranges (step S508). The above steps S502-S508 are the same or similar to the steps S302-S308 of the aforementioned embodiment, and details thereof are not repeated.

In the embodiment, if the ratio of the intersection range to the gaze ranges exceeds the preset intersection ratio, the processor 25 calculates a width-height ratio of a shape of the each of the objects (step S510), and compares the width-height ratio with a preset width-height ratio (step S512), where the width-height ratio is, for example, any number equal to 1 or greater than 1. In detail, the processor 25, for example, identifies the shape (for example, a contour or a region) of the object to generate a physical range that may cover the shape of the object viewed by multiple people, and then calculates a ratio of a width to a height of the physical range to obtain the width-height ratio.

If the width-height ratio is greater than or equal to the preset width-height ratio, it represents that the shape of the object belongs to a broad-short type, and now the processor 25 may display the object information of the object in an upper region or a lower region of the intersection range (step S514), so as to avoid a situation that the object information exceeds a display range of the transparent display 23.

If the width-height ratio is less than the preset width-height ratio, it represents that the shape of the object belongs to a thin-tall type, and now the processor 25 may display the object information of the object in a left region or a right region of the intersection range (step S516), so as to avoid the situation that the object information exceeds the display range of the transparent display 23.

Figure 5B:
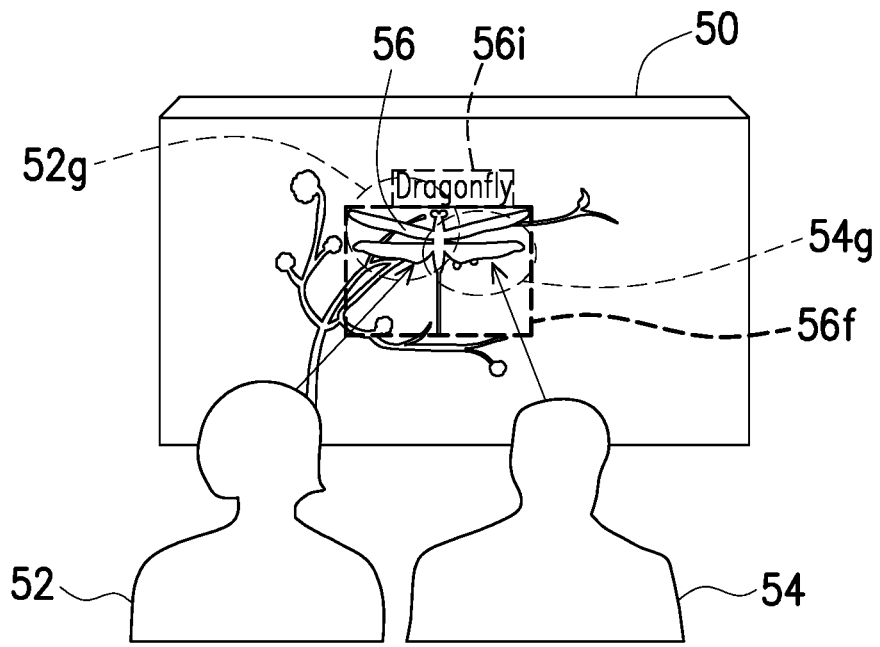
FIG. 5B and FIG. 5C are examples of the information display method suitable for multi-person viewing according to an embodiment of the disclosure.
Figure 5C:
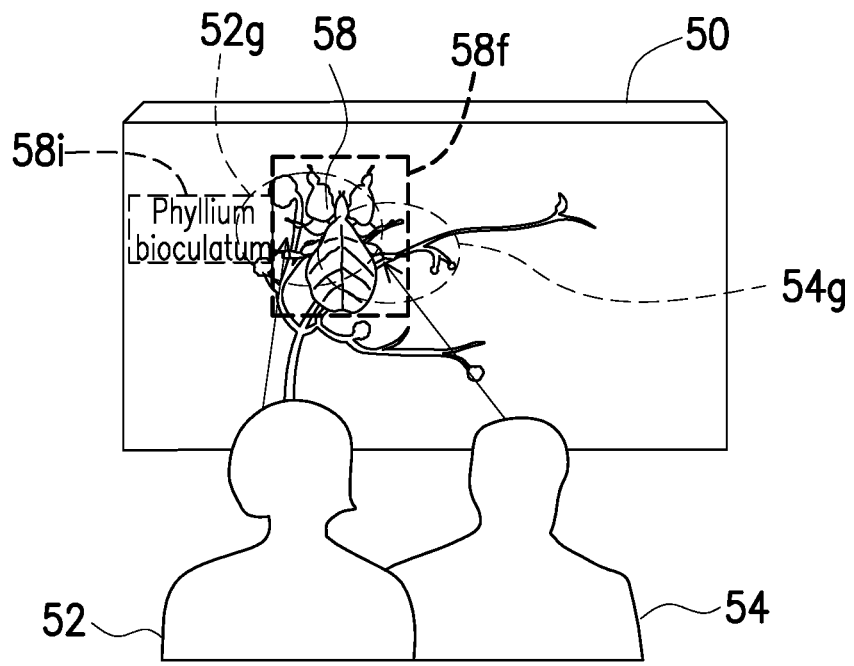

For example, FIG. 5B and FIG. 5C are examples of the information display method suitable for multi-person viewing according to an embodiment of the disclosure. Referring to FIG. 5B, when a user 52 and a user 54 simultaneously view an object 56 located at another side relative to the users through the transparent display 50, the transparent display 50 may identify relative positions respectively between the users 52, 54 and the object 56, so as to determine gaze ranges 52g and 54g of the user 52 and the user 54 viewing the transparent display 50, and a physical range 56f of a shape of the object 56 viewed by the two users. By comparing a width-height ratio of the physical range 56f with the preset width-height ratio, it is discovered that the physical range 56f belongs to the broad-short type, and now the transparent display 50 may display object information 56i of the object 56 in an upper region (or a lower region) of the intersection range.

Then, referring to FIG. 5C, when the user 52 and the user 54 simultaneously view an object 58 located at another side relative to the users through the transparent display 50, the transparent display 50 may identify relative positions respectively between the users 52, 54 and the object 58, so as to determine gaze ranges 52g and 54g of the user 52 and the user 54 viewing the transparent display 50, and a physical range 58f of a shape of the object 58 viewed by the two users. By comparing a width-height ratio of the physical range 58f with the preset width-height ratio, it is discovered that the physical range 58f belongs to the thin-tall type, and now the transparent display 50 may display object information 58i of the object 58 in the left region (or the right region) of the intersection range.

In an embodiment, when the information display apparatus 20 displays the object information, the information display apparatus 20, for example, determines whether to combine the object information according to a category of the object, and selects to display the object information in the intersection range or display the object information by keeping away from the intersection range, such that the displayed object information is adapted to be viewed by multiple people.

Figure 6:
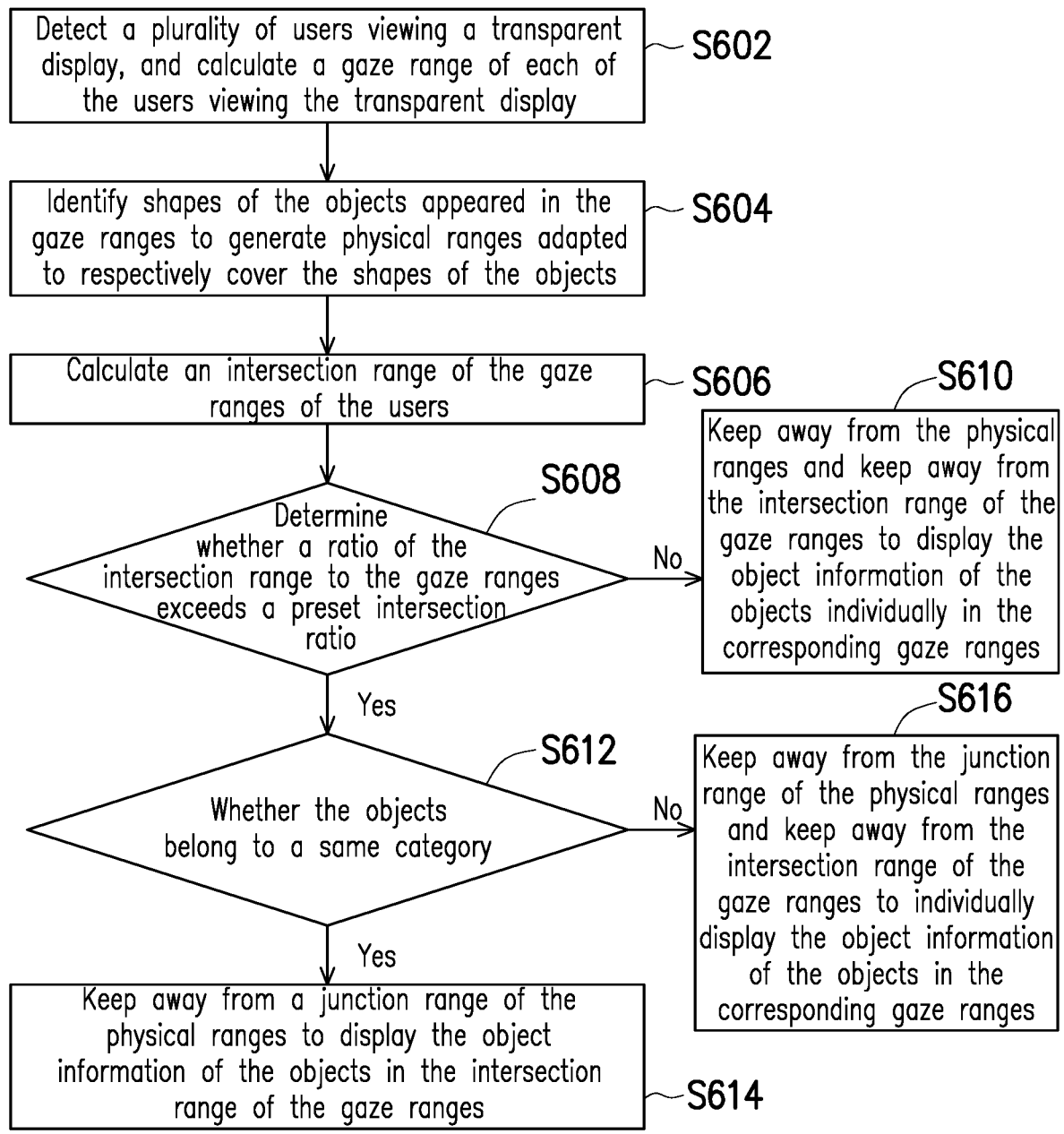
FIG. 6 is a flowchart illustrating an information display method suitable for multi-person viewing according to an embodiment of the disclosure.

FIG. 6 is a flowchart illustrating an information display method suitable for multi-person viewing according to an embodiment of the disclosure. Referring to FIG. 2 and FIG. 6, the method of the embodiment is adapted to the information display apparatus 20 of FIG. 2, and steps thereof are as follows:

First, the processor 25 detects a plurality of users viewing the transparent display 23, and calculates a gaze range of each of the users viewing the transparent display 23 (step S602), and identifies shapes of the objects appeared in the gaze ranges to generate physical ranges adapted to respectively cover the shapes of the objects (step S604). The above physical range is, for example, a minimum rectangle adapted to cover the shape of the object, though the disclosure is not limited thereto.

Then, the processor 25 calculates an intersection range of the gaze ranges of the users (step S606), and determines whether a ratio of the intersection range to the gaze ranges exceeds a preset intersection ratio (step S608). The above steps S602-S608 are the same or similar to the steps S302-S308 of the aforementioned embodiment, and details thereof are not repeated.

In the embodiment, if the ratio of the intersection range to the gaze ranges does not exceed the preset intersection ratio, the processor 25 keeps away from the physical ranges and keeps away from the intersection range of the gaze ranges to individually display the object information of the objects in the corresponding gaze ranges (step S610).

If the ratio of the intersection range to the gaze ranges exceeds the preset intersection ratio, the processor 25 determines whether the objects belong to a same category according to the object information obtained through previous identification of the objects (step S612). If the objects belong to the same category, the processor 25 keeps away from a junction range of the physical ranges to display the object information of the objects in the intersection range of the gaze ranges (step S614). Conversely, if the objects belong to different categories, the processor 25 keeps away from the junction range of the physical ranges and keeps away from the intersection range of the gaze ranges to individually display the object information of the objects in the corresponding gaze ranges (step S616).

Figure 7A:
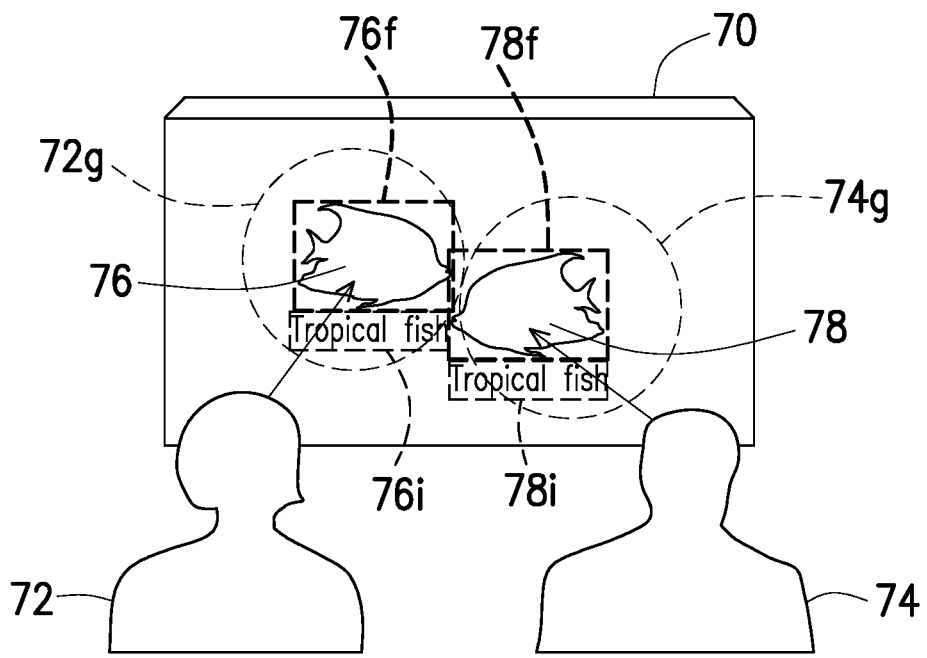
FIG. 7A and FIG. 7B are examples of the information display method suitable for multi-person viewing according to an embodiment of the disclosure.
Figure 7B:
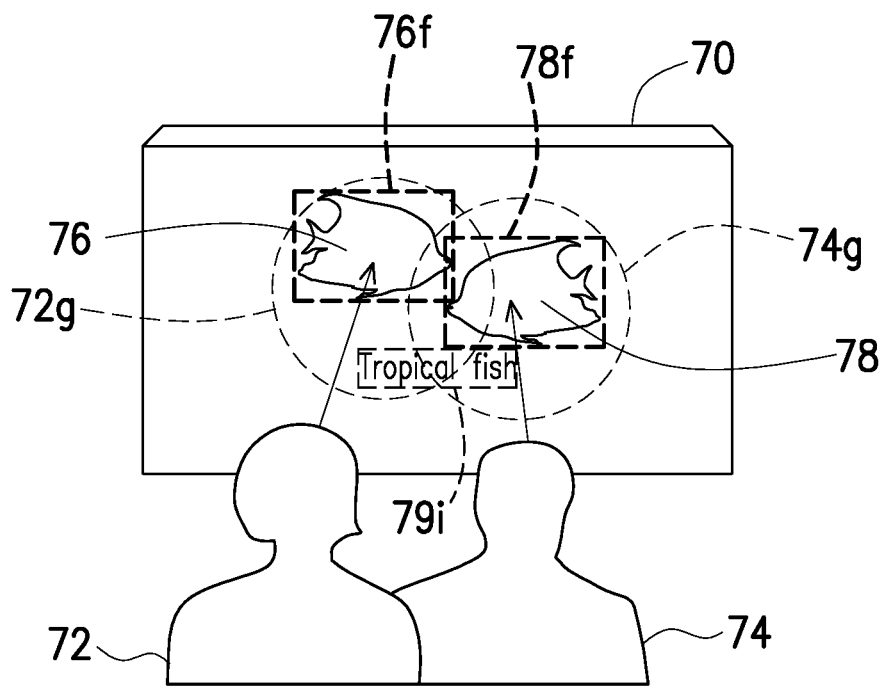

For example, FIG. 7A and FIG. 7B are examples of the information display method suitable for multi-person viewing according to an embodiment of the disclosure. Referring to FIG. 7A and FIG. 7B, when a user 72 and a user 74 simultaneously view objects 76, 78 located at another side relative to the users through the transparent display 70, the transparent display 70 may identify relative positions respectively between the users 72, 74 and the objects 76, 78, so as to determine gaze ranges 72g and 74g of the user 72 and the user 74 viewing the transparent display 70, and physical ranges 76f, 78f of shapes of the objects 76, 78 viewed by the two users. In FIG. 7A, the gaze ranges 72g and 74g of the user 72 and the user 74 are not intersected, and now the transparent display 70 may keep away from the physical ranges 76f and 78f to individually display object information 76i, 78i of the objects 76, 78 in the corresponding gaze ranges 72g and 74g. In FIG. 7B, the gaze ranges 72g and 74g of the user 72 and the user 74 are intersected, and a ratio thereof exceeds the preset intersection ratio, and now the transparent display 70 confirms that the objects 76, 78 belong to the same category, and keeps away from a junction range of the physical ranges 76f, 78f to display the object information 79i of the objects 76, 78 in the intersection range of the gaze ranges 72g and 74g.

Figure 8A:
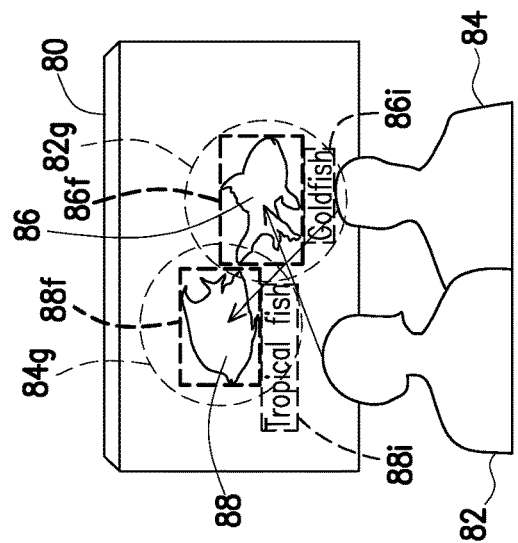
FIG. 8A to FIG. 8C are examples of the information display method suitable for multi-person viewing according to an embodiment of the disclosure.
Figure 8B:
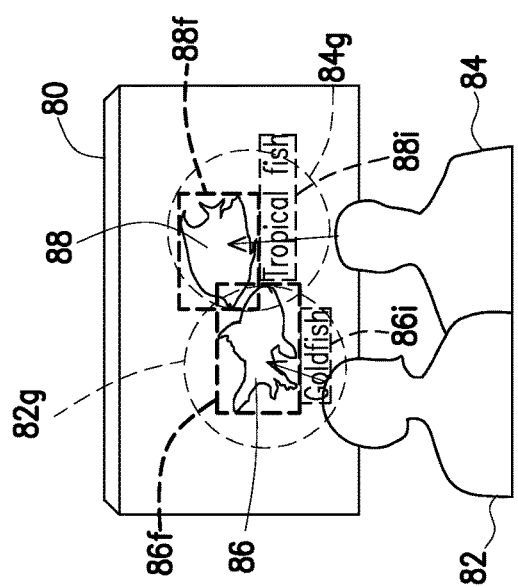
Figure 8C:
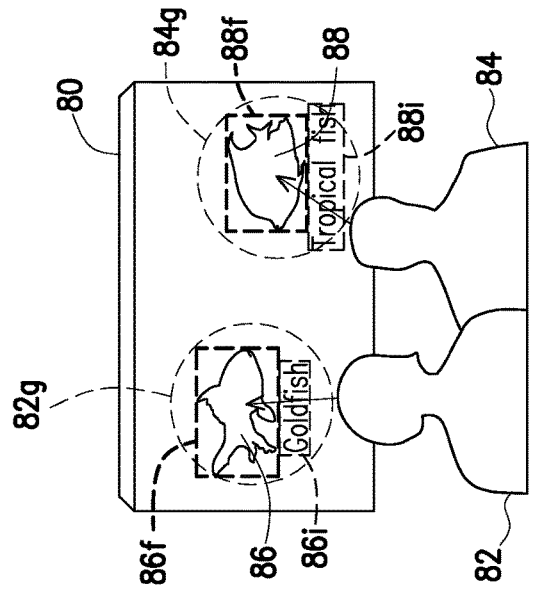

FIG. 8A to FIG. 8C are examples of the information display method suitable for multi-person viewing according to an embodiment of the disclosure. Referring to FIG. 8A to FIG. 8C, when a user 82 and a user 84 respectively view objects 86, 88 located at another side relative to the users through the transparent display 80, the transparent display 80 may identify relative positions respectively between the users 82, 84 and the objects 86, 88, so as to determine gaze ranges 82g and 84g of the user 82 and the user 84 viewing the transparent display 80, and physical ranges 86f, 88f of shapes of the objects 86, 88 viewed by the two users.

In FIG. 8A, a distance between the objects 86, 88 is relatively far, and now the gaze ranges 82g and 84g of the user 82 and the user 84 are not intersected, and the transparent display 80 may keep away from the physical ranges 86f and 88f to individually display object information 86i, 88i of the objects 86, 88 in the corresponding gaze ranges 82g and 84g. In FIG. 8B, the objects 86, 88 start to be intersected, and now the gaze ranges 82g and 84g of the user 82 and the user 84 are intersected, and an intersection ratio thereof exceeds the preset intersection ratio, and by confirming that the objects 86, 88 belong to different categories, the object information 86i, 88i of the objects 86, 88 are kept away from a junction range of the physical ranges 86f, 88f and kept away from the intersection range of the gaze ranges 82g, 84g, and are individually displayed in the corresponding gaze ranges 82g, 84g. In FIG. 8C, the objects 86, 88 have intersected, and now the gaze ranges 82g and 84g of the user 82 and the user 84 are crossed and intersected, and an intersection ratio thereof also exceeds the preset intersection ratio. Now, the transparent display 80 may also confirm that the objects 86, 88 belong to different categories, so that the transparent display 80 keeps away from the junction range of the physical ranges 86f, 88f and keeps away from the intersection range of the gaze ranges 82g, 84g to individually display the object information 86i, 88i of the objects 86, 88 in the corresponding gaze ranges 82g and 84g.

In an embodiment, when the information display apparatus 20 is to interact with an object appeared in the transparent display 23, if the gaze ranges of a plurality of users viewing the object are intersected, and a ratio of the intersection range exceeds the preset intersection ratio, the information display apparatus 20 may determine whether a first interactive display region intended to implement a first interaction with the object is located in the intersection range. If the first interactive display region is located in the intersection range, the information display apparatus 20 may display interaction information of the first interaction in the first interactive display region. Conversely, if the first interactive display region is not located in the intersection range, the information display apparatus 20 may display interaction information of a second interaction performed to the object in the first interactive display region. In brief, if the information display apparatus 20 discovers that the information displayed for implementing interaction with the object is not in the intersection range of the gaze ranges of the users, it may be changed to display the interaction information of the second interaction in the intersection range of the gaze ranges of the users, such that the multiple people may view correct interaction information.

For example, when two users view a glass cup on a table through the transparent display 23 from different angles, sight lines of the two users are, for example, intersected on a cup body. Now, if the transparent display 23 is to display an animation of inserting a straw into the glass cup, since a region intended to display the interaction information (inserting the straw) is located at a cup rim, and is not located at the intersection of the sight lines of the users, to display the animation at such region may probably result in a fact that the users view an error information (for example, the straw is inserted outside the cup). Now, the transparent display 23 may, for example, change the animation to be displayed into bubbling, and the bubbling animation may be located at the intersection of the sight lines of the users, such that the users may view the correct animation to continue performing interaction with the transparent display 23.

In an embodiment, when the information display apparatus 20 the object information in combination, the information display apparatus 20, for example, determines a display position and a display method of the object information according to shapes of the objects and a proportion of the object information to be displayed.

Figure 9:
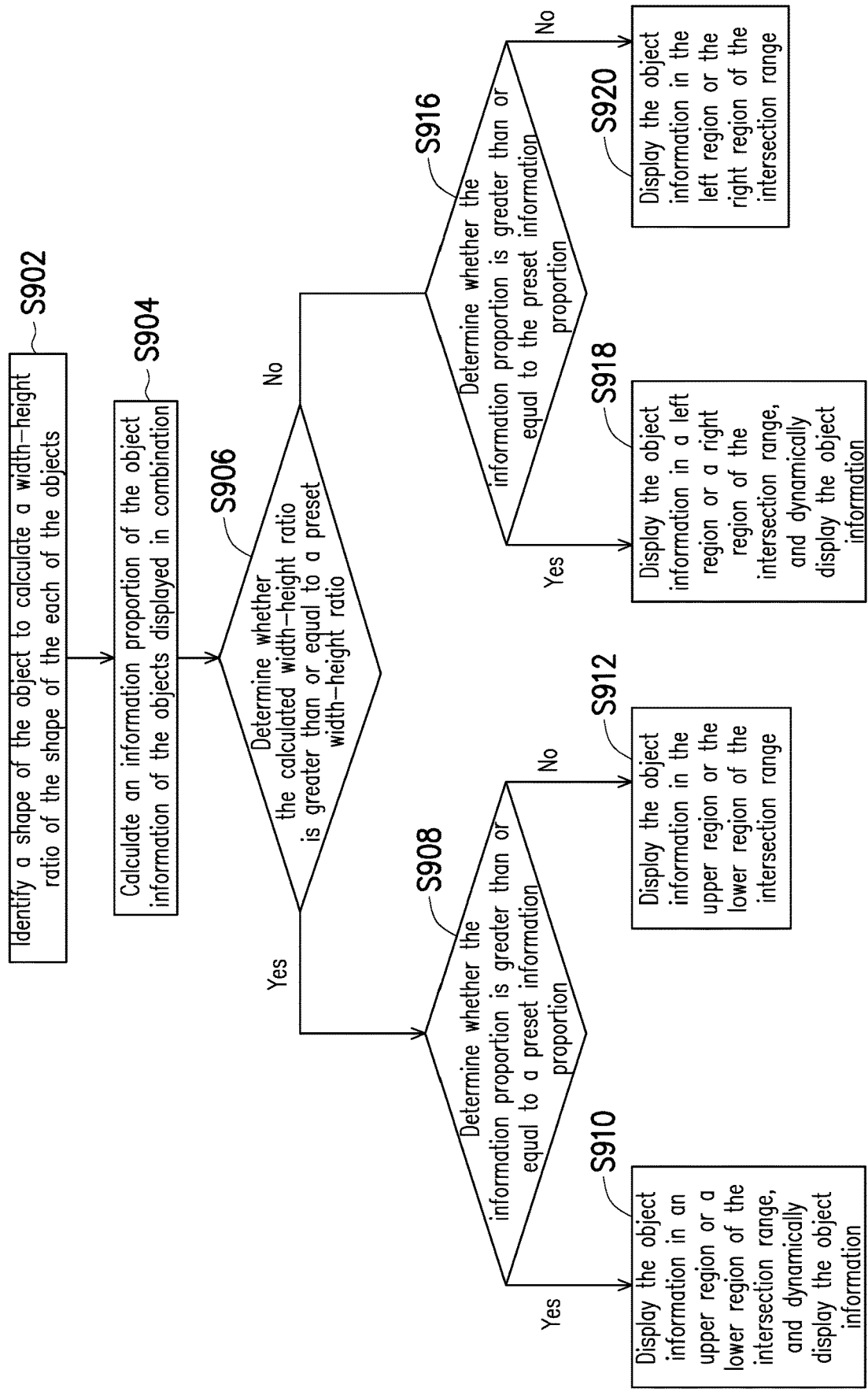
FIG. 9 is a flowchart illustrating an information display method suitable for multi-person viewing according to an embodiment of the disclosure.

FIG. 9 is a flowchart illustrating an information display method suitable for multi-person viewing according to an embodiment of the disclosure. Referring to FIG. 2 and FIG. 9, the method of the embodiment is adapted to the information display apparatus 20 of FIG. 2, and after the step S310 of FIG. 3, the steps are as follows:

First, the processor 25 identifies a shape of the object to calculate a width-height ratio of the shape of the object (step S902). The processor 25, for example, identifies the shape (for example, a contour or a region) of the object to generate a physical range that may cover the shape of the object viewed by multiple people, and then calculates a ratio of a width to a height of the physical range to obtain the width-height ratio.

Then, the processor 25 calculates an information proportion of the object information of the objects displayed in combination (step S904). The object information is, for example, a text or a picture, and the information proportion is, for example, a ratio of a width to a height of a text display region, or a ratio of a width to a height of the picture, which is determined according to the type of the object information, and is not limited by the disclosure.

Then, the processor 25 may compare the calculated width-height ratio with the preset width-height ratio, and compare the calculated information proportion with a preset information proportion to determine a region and method for displaying the preset information in the intersection range.

In detail, the processor 25, for example, determines whether the calculated width-height ratio is greater than or equal to the preset width-height ratio (step S906). The preset width-height ratio is, for example, a value between 1.5 and 2, which is not limited by the disclosure.

If the calculated width-height ratio is greater than or equal to the preset width-height ratio, the processor 25 further determines whether the information proportion is greater than or equal to the preset information proportion (step S908). The preset information proportion is, for example, a value between 1 and 1.2, which is not limited by the disclosure.

If the information proportion is greater than or equal to the preset information proportion, the processor 25 displays the object information in an upper region or a lower region of the intersection range of the gaze ranges of the users, and dynamically displays the object information (step S910). Conversely, if the information proportion is not greater than the preset information proportion, the processor 25 displays the object information in the upper region or the lower region of the intersection range (step S912). The dynamic display is, for example, to segment the object information into a plurality of segments for segmentally displaying according to the number of words or the length, for example, to display about 3-5 words each time.

On the other hand, in step S916, if the calculated width-height ratio is not greater than the preset width-height ratio, the processor 25 further determines whether the information proportion is greater than or equal to the preset information proportion (step S916). The preset information proportion is, for example, a value between 1 and 1.2, which is not limited by the disclosure.

If the information proportion is greater than or equal to the preset information proportion, the processor 25 displays the object information in left region or a right region of the intersection range, and dynamically displays the object information (step S918). Conversely, if the information proportion is not greater than the preset information proportion, the processor 25 displays the object information in the left region or the right region of the intersection range (step S920).

According to the above method, the position and method for displaying the object information may be suitably adjusted according to different shapes of the objects and different information proportions, so that the displayed object information is suitable for being viewed by multiple people.

In an embodiment, the information display apparatus 20 may calculate a visual range of the user viewing the transparent display 23, and determine whether to divide the transparent display 23 to perform information display according to an area ratio of the visual range to the whole transparent display 23.

Figure 10:
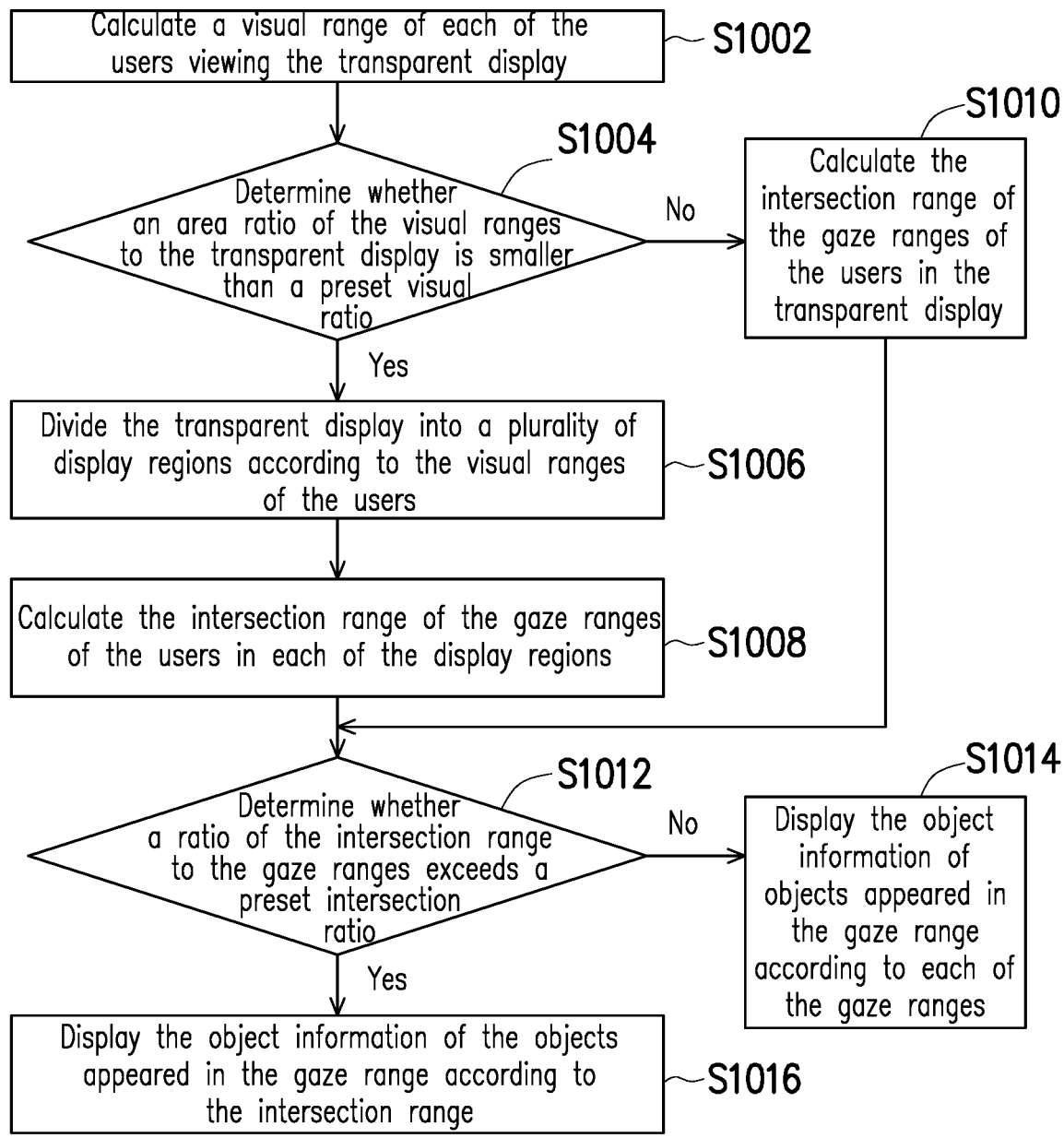
FIG. 10 is a flowchart illustrating an information display method suitable for multi-person viewing according to an embodiment of the disclosure.

FIG. 10 is a flowchart illustrating an information display method suitable for multi-person viewing according to an embodiment of the disclosure. Referring to FIG. 2 and FIG. 10, the method of the embodiment is adapted to the information display apparatus 20 of FIG. 2, and the steps thereof are as follows:

First, the processor 25 calculates a visual range of each of the users viewing the transparent display 23 for a plurality of users viewing the transparent display 23 (step S1002). The above visual range may be determined by the visual angle of a human eye, and as described above, the horizontal angle of human eye's visual angle is about 124°, the vertical angle thereof is about 120°, and the comprehensive viewing angle of the two eyes is about 170°. Similar to the calculation method of the aforementioned gaze ranges, after obtaining the distance between the human eye and the transparent display 23, a visual range that the human eye views the transparent display 23 may be calculated according to the above human eye visual angle.

Then, the processor 25 determines whether an area ratio of the visual ranges to the transparent display 23 is smaller than a preset visual ratio (step S1004). The above preset visual ratio is, for example, any number between 0.6 and 0.9, which is not limited by the disclosure.

If the area ratio of the visual ranges is smaller than the preset visual ratio, it represents that the users probably cannot view a part of the transparent display 23, and now the processor 25 divides the transparent display 23 into a plurality of display regions according to the visual ranges of the users (step S1006), and calculates the intersection range of the gaze ranges of the users viewing such display region for each of the display regions (step S1008), so as to implement the subsequent information display.

On the other hand, if the area ratio of the visual ranges is not smaller than the preset visual ratio, it represents that the users may view most of the transparent display 23, and now the processor 25 does not divide the transparent display 23, and maintains to calculate the intersection range according to the gaze ranges of all of the users appeared in the transparent display 23 (step S1010).

After the intersection range is calculated, the processor 25 determines whether a ratio of the intersection range to the gaze ranges exceeds a preset intersection ratio (step S1012). If yes, the processor 25 displays the object information of the objects appeared in the gaze range according to the intersection range (step S1016). Conversely, the processor 25 displays the object information of objects appeared in the gaze range according to each of the gaze ranges (step S1014).

Figure 11:
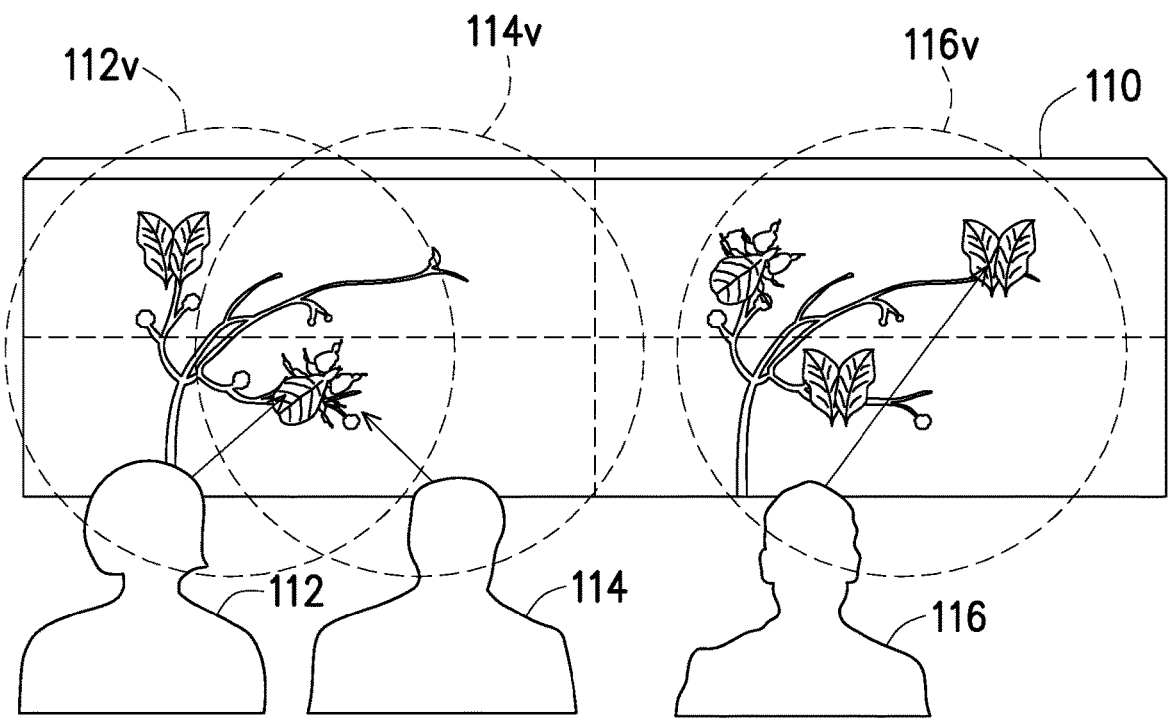
FIG. 11 is an example of an information display method suitable for multi-person viewing according to an embodiment of the disclosure.

For example, FIG. 11 is an example of the information display method suitable for multi-person viewing according to an embodiment of the disclosure. Referring to FIG. 11, when users 112, 114, 116 simultaneously view the objects located at another side of the users through the transparent display 110, by determining the distances between the users 112, 114, 116 and the transparent display 110 and viewing directions of the eyes of the users viewing the objects, visual ranges 112*v*, 114*v*, 116*v* of the users 112, 114, 116 viewing the transparent display 110 are determined. An area ratio of the visual ranges 112*v*, 114*v* of the users 112, 114 and the transparent display 110 is smaller than a preset visual ratio, and the information display apparatus 20 may divide the transparent display 110 into, for example, 4 regions, and perform sight line intersection calculation and information display for the users in each of the users. For example, the information display apparatus 20 may perform sight line intersection calculation and information display for the users 112, 114 with the visual ranges 112*v* and 114*v* falling to a lower left corner of the transparent display 110, and perform information display for the user 116 with the visual range 116*v* falling to an upper right corner of the transparent display 110.

In an embodiment, the processor 25 may, for example, calculate the gaze ranges and perform grouping for a plurality of users viewing the transparent display 23, and divide the transparent display 23 into a plurality of display regions according to a grouping result, and calculate the gaze ranges and the intersection range for the users of a same group.

Figure 12:
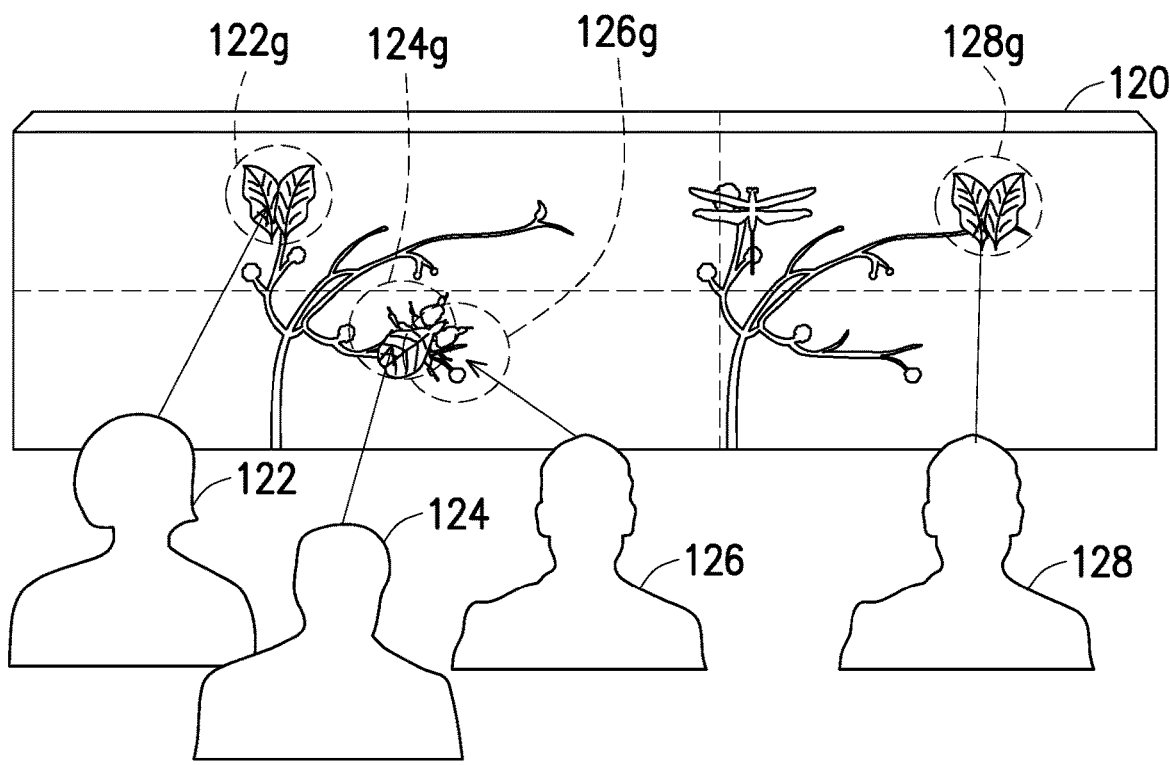
FIG. 12 is an example of the information display method suitable for multi-person viewing according to an embodiment of the disclosure.

For example, FIG. 12 is an example of the information display method suitable for multi-person viewing according to an embodiment of the disclosure. Referring to FIG. 12, when users 122, 124, 126, 128 simultaneously view the objects located at another side of the users through the transparent display 120, the transparent display 120 may identify the distances between the users 122, 124, 126, 128 and the transparent display 120, so as to calculate gaze ranges 122g, 124g, 126g, 128g of the users 122, 124, 126, 128. According to a distribution of the gaze ranges 122g, 124g, 126g, 128g, the information display apparatus 20 may group the gaze ranges 124g, 126g close to each other into one group, and take the stray gaze ranges 122g, 128g as another group. According to the grouping result, the information display apparatus 20 may divide the transparent display 120 into four regions. As more people view the left side of the transparent display 120, a width of the upper left region and the lower left region divided by the information display apparatus 20 may be greater than a width of the upper right region and the lower right region. After the grouping is determined, the information display apparatus 20 may calculate the gaze ranges and the intersection range for the users of the same group, and accordingly display the object information of the objects appeared in the gaze ranges in the corresponding display region.

The embodiments of the disclosure provide the information display method and information display apparatus suitable for multi-person viewing, and by calculating the gaze ranges and/or intersection range of a plurality of users viewing the transparent display, the same object viewed by the users is found, and the object information is suitably displayed in or around the gaze ranges or the intersection range, such that while the information display amount is reduced, the users are ensured to view the correct object information. Moreover, in an embodiment of the disclosure, by combining the techniques such as object category identification, object shape identification, display information shape identification, user visual range identification, etc., the information displayed on the transparent display is adapted to be viewed by multiple users.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. An information display method suitable for multi-person viewing, adapted to an electronic apparatus having a transparent display and a processor, and the information display method suitable for multi-person viewing comprising:
    detecting a plurality of users viewing the transparent display, and calculating a gaze range of each of the users viewing the transparent display, wherein the gaze range of each of the users is determined based on a central identification angle of a human eye of the user and a distance between the user and the transparent display;
    calculating an intersection range of the gaze ranges of the users, and determining whether a ratio of the intersection range to the gaze ranges exceeds a preset intersection ratio;
    if the ratio of the intersection range to the gaze ranges does not exceed the preset intersection ratio, displaying object information of objects appearing in the gaze range according to each of the gaze ranges; and
    if the ratio of the intersection range to the gaze ranges exceeds the preset intersection ratio, displaying the object information of the objects appearing in the gaze range according to the intersection range.

2. The information display method suitable for multi-person viewing according to claim 1, wherein the step of displaying the object information of the objects appearing in the gaze range according to the intersection range comprises:
    identifying each of the objects appearing in the gaze range to obtain the object information, and determining whether the objects belong to a same category according to the object information;
    if the objects belong to the same category, displaying the object information of the objects in combination in or around the intersection range; and
    if the objects do not belong to the same category, displaying the object information of the objects individually in or around the corresponding gaze range.

3. The information display method suitable for multi-person viewing according to claim 2, wherein the step of displaying the object information of the objects in combination in or around the intersection range comprises:
    identifying a shape of each of the objects to calculate a width-height ratio of the shape of the object, and comparing the width-height ratio with a preset width-height ratio;
    if the width-height ratio is greater than or equal to the preset width-height ratio, displaying the object information of the object in an upper region or a lower region of the intersection range; and
    if the width-height ratio is smaller than the preset width-height ratio, displaying the object information of the object in a left region or a right region of the intersection range.

4. The information display method suitable for multi-person viewing according to claim 2, wherein the step of displaying the object info nation of the objects in combination in or around the intersection range comprises:
    identifying shapes of the objects to generate a plurality of physical ranges respectively covering the shapes of the objects; and
    keeping away from a junction range of the physical ranges to display the object information of the objects in or around the intersection range of the gaze ranges.

5. The information display method suitable for multi-person viewing according to claim 2, wherein the step of displaying the object information of the objects individually in or around the corresponding gaze range comprises:
    identifying shapes of the objects to generate a plurality of physical ranges respectively covering the shapes of the objects; and
    keeping away from a junction range of the physical ranges and keeping away from the intersection range of the gaze ranges to display the object information of the objects individually in or around the corresponding gaze range.

6. The information display method suitable for multi-person viewing according to claim 2, wherein the step of displaying the object information of the objects in combination in or around the intersection range comprises:
    determining whether a first interactive display region intended to implement a first interaction with the object is located in the intersection range;
    if the first interactive display region is located in the intersection range, displaying interaction information of the first interaction in the first interactive display region; and
    if the first interactive display region is not located in the intersection range, displaying interaction information of a second interaction performed to the object in a second interactive display region.

7. The information display method suitable for multi-person viewing according to claim 2, wherein the step of displaying the object information of the objects in combination in or around the intersection range comprises:
identifying a shape of each of the objects to calculate a width-height ratio of the shape of the object;
calculating an information proportion of the object information of the object displayed in combination;
comparing the width-height ratio with a preset width-height ratio, and comparing the information proportion with a preset information proportion to determine a region and a method for displaying preset information in the intersection range.

8. The information display method suitable for multi-person viewing according to claim 7, wherein the step of comparing the width-height ratio with the preset width-height ratio, and comparing the information proportion with the preset information proportion to determine the region and the method for displaying the preset information in the intersection range comprises:
if the width-height ratio is greater than or equal to the preset width-height ratio, and the information proportion is greater than or equal to the preset information proportion, displaying the object information in an upper region or a lower region of the intersection range, and dynamically displaying the object information;
if the width-height ratio is greater than or equal to the preset width-height ratio, and the information proportion is smaller than the preset information proportion, displaying the object information in the upper region or the lower region of the intersection range;
if the width-height ratio is smaller than the preset width-height ratio, and the information proportion is smaller than the preset information proportion, displaying the object information in a left region or a right region of the intersection range; and
if the width-height ratio is smaller than the preset width-height ratio, and the information proportion is greater than or equal to the preset information proportion, displaying the object information in the left region or the right region of the intersection range, and dynamically displaying the object information.

9. The information display method suitable for multi-person viewing according to claim 1, wherein the step of detecting the plurality of users viewing the transparent display further comprises:
calculating a visual range of each of the users viewing the transparent display, and determining whether an area ratio of the visual range to the transparent display is smaller than a preset visual ratio;
if the area ratio of the visual range is smaller than the preset visual ratio, dividing the transparent display into a plurality of display regions according to the visual ranges of the users, and calculating the gaze ranges and the intersection range of the users with the visual ranges falling within the same display region to display the object information of the objects appearing in the gaze range in the display region; and
if the area ratio of the visual range is not smaller than the preset visual ratio, not to divide the display region.

10. The information display method suitable for multi-person viewing according to claim 1, wherein after the step of calculating the gaze range of each of the users viewing the transparent display, the method further comprises:
grouping the gaze ranges, and dividing the transparent display into a plurality of display regions according to a grouping result, and calculating the gaze ranges and the intersection range for the users of a same group to display the object information of the objects appearing in the gaze range in the corresponding display region.

11. An information display apparatus, comprising:
a transparent display;
a first information capturing device, capturing internal user information of users viewing the transparent display;
a second information capturing device, capturing external object information at another side of the transparent display relative to the users; and
a processor, coupled to the transparent display, the first information capturing device and the second information capturing device, and configured to load and execute a plurality of program instructions to:
detect the users in the internal user information, and calculate a gaze range of each of the users viewing the transparent display, wherein the gaze range of each of the users is determined based on a central identification angle of a human eye of the user and a distance between the user and the transparent display;
calculate an intersection range of the gaze ranges of the users, and determine whether a ratio of the intersection range to the gaze ranges exceeds a preset intersection ratio;
if the ratio of the intersection range to the gaze ranges does not exceed the preset intersection ratio, display object information of objects appearing in the gaze range according to each of the gaze ranges; and
if the ratio of the intersection rage to the gaze ranges exceeds the preset intersection ratio, display the object information of the objects appearing in the gaze range according to the intersection range.

12. The information display apparatus according to claim 11, wherein the processor comprises:
identifying each of the objects appearing in the gaze range to obtain the object information, and determining whether the objects belong to a same category according to the object information;
if the objects belong to the same category, displaying the object information of the objects in combination in or around the intersection range; and
if the objects do not belong to the same category, displaying the object information of the objects individually in or around the corresponding gaze range.

13. The information display apparatus according to claim 12, wherein the processor comprises:
identifying a shape of each of the objects to calculate a width-height ratio of the shape of the object, and comparing the width-height ratio with a preset width-height ratio;
if the width-height ratio is greater than or equal to the preset width-height ratio, displaying the object information of the object in an upper region or a lower region of the intersection range; and
if the width-height ratio is smaller than the preset width-height ratio, displaying the object information of the object in a left region or a right region of the intersection range.

14. The information display apparatus according to claim 12, wherein the processor comprises:

identifying shapes of the objects to generate a plurality of physical ranges respectively covering the shapes of the objects; and keeping away from a junction range of the physical ranges to display the object information of the objects in or around the intersection range of the gaze ranges.

15. The information display apparatus according to claim 12, wherein the processor comprises:

identifying shapes of the objects to generate a plurality of physical ranges respectively covering the shapes of the objects; and keeping away from a junction range of the physical ranges and keeping away from the intersection range of the gaze ranges to display the object information of the objects individually in or around the corresponding gaze range.

16. The information display apparatus according to claim 12, wherein the processor comprises:

determining whether a first interactive display region intended to implement a first interaction with the object is located in the intersection range;

if the first interactive display region is located in the intersection range, displaying interaction information of the first interaction in the first interactive display region; and if the first interactive display region is not located in the intersection range, displaying interaction information of a second interaction performed to the object in a second interactive display region.

17. The information display apparatus according to claim 12, wherein the processor comprises:

identifying a shape of each of the objects to calculate a width-height ratio of the shape of the object;

calculating an information proportion of the object information of the object displayed in combination;

comparing the width-height ratio with a preset width-height ratio, and comparing the information proportion with a preset information proportion to determine a region and a method for displaying preset information in the intersection range.

18. The information display apparatus according to claim 17, wherein the processor comprises:

if the width-height ratio is greater than or equal to the preset width-height ratio, and the information proportion is greater than or equal to the preset information proportion, displaying the object information in an upper region or a lower region of the intersection range, and dynamically displaying the object information;

if the width-height ratio is greater than or equal to the preset width-height ratio, and the information proportion is smaller than the preset information proportion, displaying the object information in the upper region or the lower region of the intersection range;

if the width-height ratio is smaller than the preset width-height ratio, and the information proportion is smaller than the preset information proportion, displaying the object information in a left region or a right region of the intersection range; and if the width-height ratio is smaller than the preset width-height ratio, and the information proportion is greater than or equal to the preset information proportion, displaying the object information in the left region or the right region of the intersection range, and dynamically displaying the object information.

19. The information display apparatus according to claim 11, wherein the processor further comprises:

calculating a visual range of each of the users viewing the transparent display, and determining whether an area ratio of the visual range to the transparent display is smaller than a preset visual ratio;

if the area ratio of the visual range is smaller than the preset visual ratio, dividing the transparent display into a plurality of display regions according to the visual ranges of the users, and calculating the gaze ranges and the intersection range of the users with the visual ranges falling within the same display region to display the object information of the objects appearing in the gaze range in the display region; and if the area ratio of the visual range is not smaller than the preset visual ratio, not to divide the display region.

20. The information display apparatus according to claim 11, wherein the processor further comprises:

grouping the gaze ranges, and dividing the transparent display into a plurality of display regions according to a grouping result, and calculating the gaze ranges and the intersection range for the users of a same group to display the object information of the objects appearing in the gaze range in the corresponding display region.

* * * * *